United States Patent
Dore et al.

(10) Patent No.: US 9,178,727 B2
(45) Date of Patent: Nov. 3, 2015

(54) FBMC RECEIVER WITH CARRIER FREQUENCY OFFSET COMPENSATION

(71) Applicant: COMMISSARIAT A L'ENERGIE ATOMIQUE ET AUX ENE ALT, Paris (FR)

(72) Inventors: Jean-Baptiste Dore, Saint Martin le Vinoux (FR); Nicolas Cassiau, Saint Etienne de Crossey (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/474,728

(22) Filed: Sep. 2, 2014

(65) Prior Publication Data

US 2015/0063507 A1 Mar. 5, 2015

(30) Foreign Application Priority Data

Sep. 4, 2013 (FR) ...................................... 13 58446

(51) Int. Cl.
*H03D 1/06* (2006.01)
*H04L 25/03* (2006.01)
*H04L 27/26* (2006.01)

(52) U.S. Cl.
CPC ...... *H04L 25/03159* (2013.01); *H04L 27/2601* (2013.01); *H04L 27/264* (2013.01)

(58) Field of Classification Search
None
See application file for complete search history.

(56) References Cited

U.S. PATENT DOCUMENTS

2002/0021715 A1* 2/2002 Matheus et al. ............... 370/480
2014/0348268 A1* 11/2014 Siohan et al. ................. 375/298

OTHER PUBLICATIONS

Botaro Hirosaki, "An Orthogonally Multiplexed QAM System Using the Discrete Fourier Transform", IEEE Transactions on Communications, vol. 29, No. 7, Jul. 1981, pp. 982-989.
Pierre Siohan et al., "Analysis and Design of OFDM/OQAM Systems Based on Filterbank Theory", IEEE Transactions on Signal Processing, vol. 50, No. 5, May 2002, pp. 1170-1183.
M. Bellanger et al., "FBMC Physical Layer: A Primer", available on the website www.ict-phydyas.org.
U.S. Appl. No. 14/547,625, filed Nov. 19, 2014, Dore, et al.
French Preliminary Search Report issued Jun. 27, 2014, in Patent Application No. FR 1358446, filed Sep. 4, 2013 (with English Translation of Category of Cited Documents).

(Continued)

*Primary Examiner* — Adolf Dsouza
(74) *Attorney, Agent, or Firm* — Oblon, McClelland, Maier & Neustadt, L.L.P.

(57) ABSTRACT

A filter bank receiver (FBMC) effecting a carrier frequency offset compensation in the frequency domain. The receiver comprises an FFT module extended by the overlap factor (610), a module (630) offsetting a predetermined number of subcarriers at the output of the FFT followed by a filter for reducing interference between subcarriers (640), the number of subcarriers and the coefficients of the interference reduction filter being determined from an estimation ($\widehat{\delta F}$) of the frequency offset. The vector of samples thus obtained is then the subject of channel equalisation (650) before being filtered by a battery of analysis filters and spectrally de-spread (660). Finally, after spectral de-spreading, the vector of samples is demodulated by an OQAM demodulation (670) so as to recover the transmitted data.

15 Claims, 9 Drawing Sheets (56) References Cited

OTHER PUBLICATIONS

Tobias Hidalgo Stitz, et al., "CFO estimation and correction in a WiMAX-like FBMC system", Signal Processing Advances in Wireless Communications, XP 031487904, Jun. 21, 2009, pp. 633-637.

Qing Bai, et al., On the Effects of Carrier Frequency Offset on Cyclic Prefix Based OFDM and Filter Bank Based Multicarrier Systems, Signal Processing Advances in Wireless Communications, XP 031837458, Jun. 20, 2010, pp. 1-5.

Frank Schaich, "Filterbank Based Multi Carrier Transmission (FBMC)—evolving OFDM: FBMC in the context of WiMAX", European Wireless Conference, XP 031688571, Apr. 12, 2010, pp. 1051-1058.

U.S. Appl. No. 14/533,480, filed Nov. 5, 2014, Mawlawi, et al.

* cited by examiner

FBMC RECEIVER WITH CARRIER FREQUENCY OFFSET COMPENSATION

TECHNICAL FIELD

The present invention concerns in general terms the field of telecommunication systems using filter bank multicarrier (FBMC) modulation.

PRIOR ART

Telecommunication systems using multicarrier modulation are well known in the prior art. The principle of such modulation consists of dividing the transmission band into a plurality of frequency sub-channels associated with subcarriers and modulating each of these subcarriers by data to be transmitted.

The most widespread multicarrier modulation is without any doubt OFDM (Orthogonal Frequency Division Multiplexing) modulation. This is used in wireless local networks (WLAN), WiFi, in high bit rate wireless internet access (WiMAX), digital radio broadcasting systems (DVB-T, ISDB-T, DAB), asymmetric digital links (xDSL), fourth generation cellular telephony (LTE), etc.

In an OFDM transmission system, each block of OFDM symbols is preceded by a guard time or a cyclic prefix, with a length greater than the time spread of the impulse response of the channel, so as to eliminate intersymbol interference. The insertion of a guard time or a prefix does however lead to a loss of spectral efficiency. Finally, since the spectral occupation of an OFDM signal is substantially greater than the subcarrier band that it uses because of the spread of the secondary lobes, OFDM modulation is not an optimum solution for applications requiring high off-band rejection levels.

Filter bank or FBMC modulation may be used as an alternative to OFDM modulation.

The principle of FBMC modulation is based on a synthesis by a filter bank on transmission and an analysis by a filter bank on reception.

Figure 1:
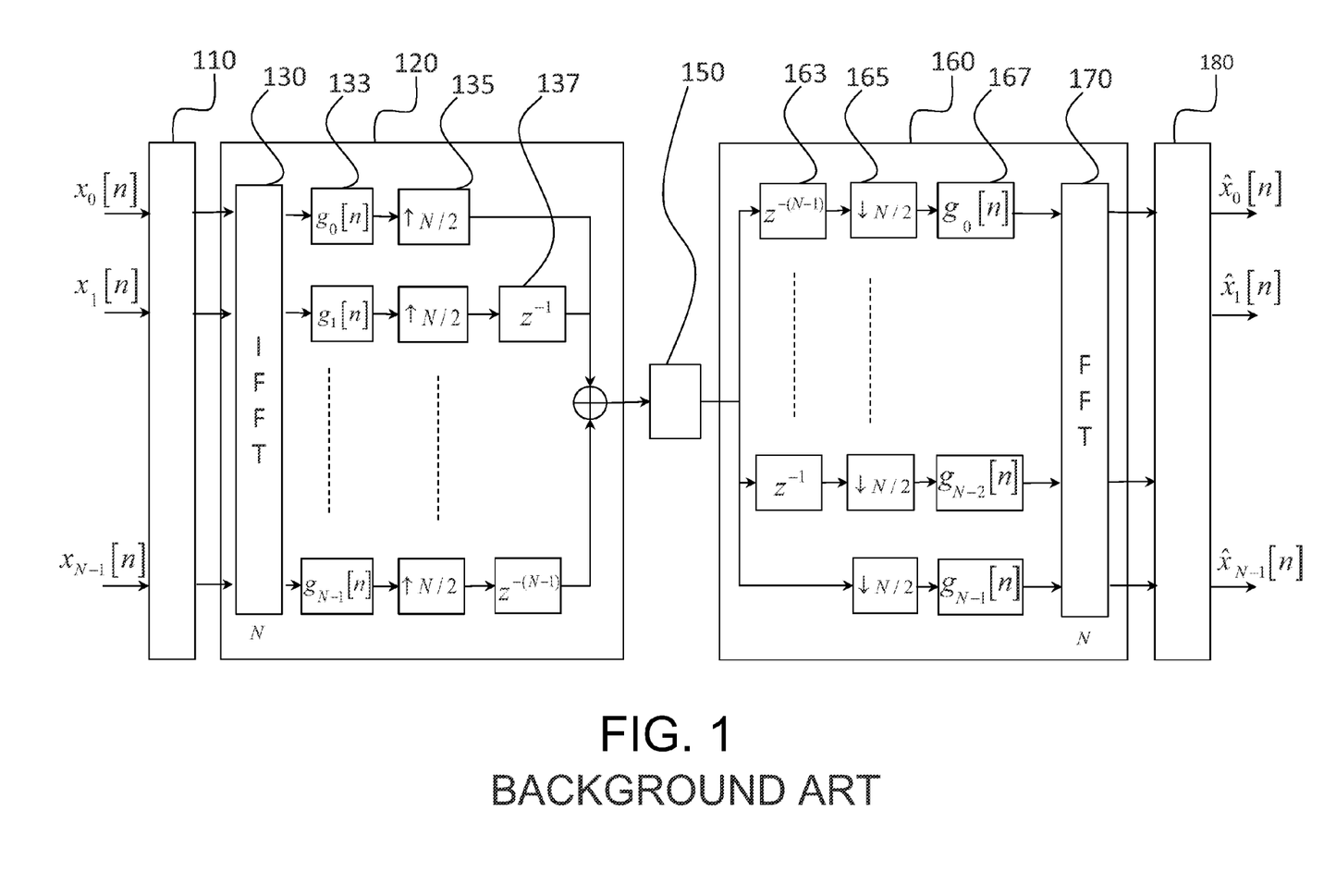
FIG. 1 shows a first implementation of an FBMC transmission/reception system known from the prior art.

FIG. 1 shows schematically the structure of a first FBMC transmission/reception system known from the prior art.

This structure was described in detail in the article by B Hirosaki entitled "An orthogonally multiplexed QAM system using the discrete Fourier transform" published in IEEE Trans on Comm, vol. 29, No. 7, pp 982-989, July 1981, as well as in the article by P Siohan et al entitled "Analysis and design of OFDM/OQAM systems based on filterbank theory" published in IEEE Trans on Signal Processing, vol. 50, No 5, pp 1170-1183, May 2002.

At the transmitter, the QAM modulation symbols to be transmitted at a rate Nf where f=1/T, are grouped by blocks of size N, $x_0[n], \ldots, x_{N-1}[n]$, where n is the time index of the block. Each block of N symbols is supplied in parallel to N input channels of a pre-processing module 110, referred to as OQAM (Offset QAM) pre-processing. This pre-processing module modulates the OQAM-type data, that is to say temporally demultiplexes the real part and the imaginary part of $x_k[n]$ at a rate of 2f.

The samples thus obtained are supplied in the form of blocks of size N to a synthesis filter bank 120, consisting of an IFFT (inverse fast Fourier transform) module of size N, 130, a plurality N of polyphase filters 133, a plurality of oversamplers 135, of factor M=N/2, at the output of the various polyphase filters, and finally a plurality of delays, 137, arranged in parallel and varying from 0 to N−1 sampling periods. Each of the N processing channels corresponds to a subchannel.

The outputs of the polyphase filters, oversampled and delayed, are added by the adder 139 before transmission over the channel 150.

The polyphase filters are versions translated for frequency by k/MT of a prototype filter the impulse response of which is of duration KT, in other words the output of a polyphase filter temporally overlaps the output of the adjacent polyphase filter of M samples. As a result a polyphase filter output temporally overlaps K other polyphase filter outputs. The factor K is for this reason called the overlapping factor.

On the receiver side, the received signal is sampled at a rate Nf. The samples are supplied in the form of blocks of size N to an analysis filter bank 160, comprising a plurality of delays, 163, arranged in parallel and varying from 0 to N−1 sampling periods, in the reverse order of the delays 137. The flows of samples issuing from the various delays are then decimated by a factor M=N/2 by the decimators 165 and then filtered by the analysis filters 167. The analysis filters have an impulse response conjugated and temporally reversed with respect to the corresponding synthesis filter. Given that the prototype filter has real values and is symmetrical by temporal reversal, it is possible to show that an analysis filter has the same impulse response as the corresponding synthesis filter. The combination of a synthesis filter with the corresponding analysis filter (the product of transfer functions) gives a Nyquist filter.

The symbols output from the synthesis filters are then the subject of an FFT (fast Fourier transform) of size N at 170, the various frequency components of the FFT then being supplied to the post-processing module 180 effecting a processing that is the reverse of that of the pre-processing 110.

The synthesis/analysis filtering being performed in the time domain, respectively at the output of the IFFT module and at the input of the FFT module, the FBMC system illustrated in FIG. 1 will be said to be implemented in the time domain.

The FBMC system is capable of representation in the frequency domain as described in the document by M Bellanger et al entitled "FBMc physical layer: a primer" available on the website www.ict-phydyas.org.

Figure 2:
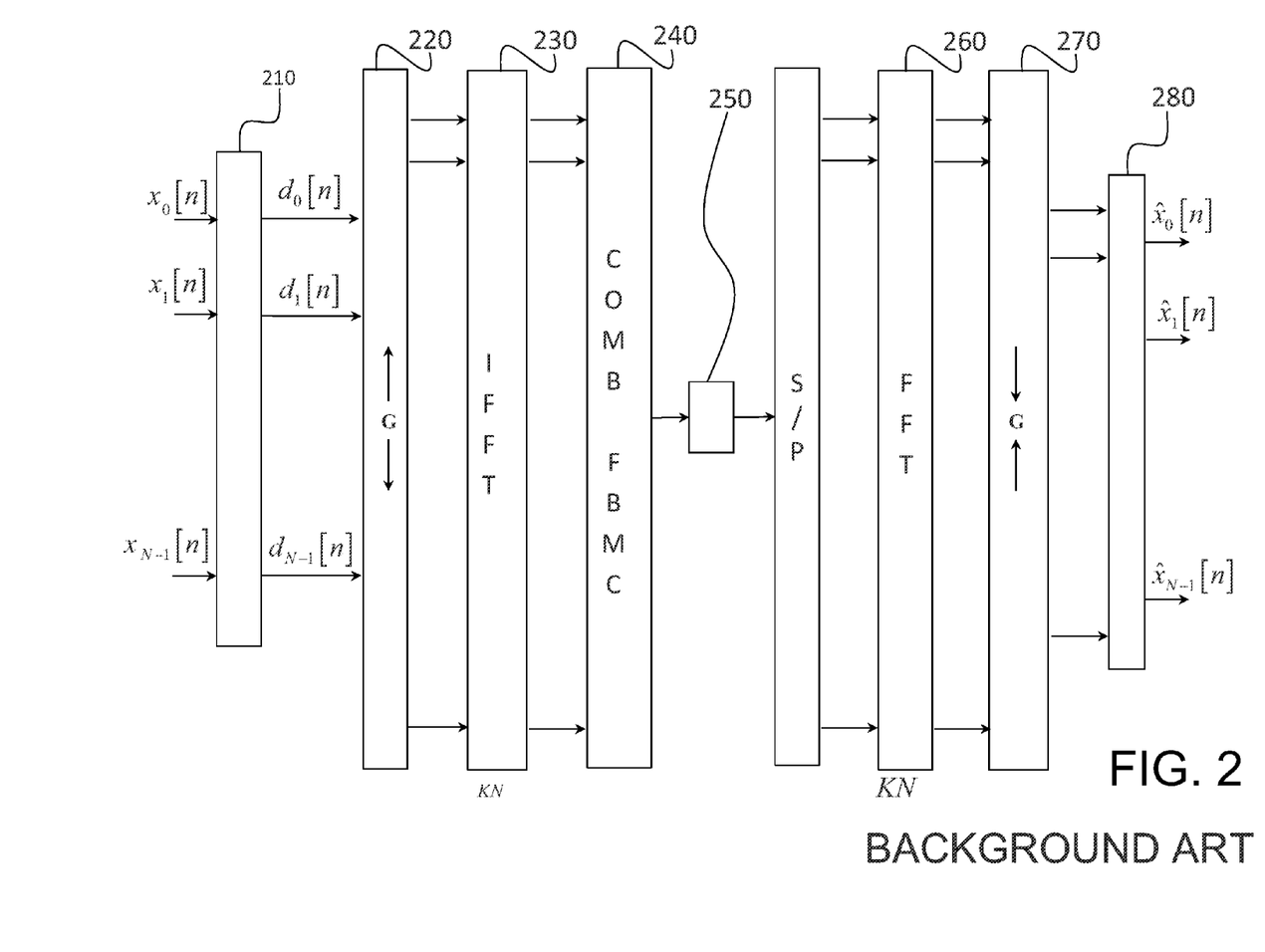
FIG. 2 shows a second implementation of an FBMC transmission/reception system known from the prior art.

An implementation of the FBMC system in the frequency domain is depicted in FIG. 2.

FIG. 2 shows the pre-processing module 210 effecting an OQAM modulation of the data to be transmitted.

Each of the data is then spread in frequency over a range of 2K−1 adjacent subcarriers centred on a subchannel subcarrier, each data item being weighted by the (real) value taken by the transfer function of the synthesis filter at the corresponding frequency. In other words each OQAM symbol $d_i[n]$ is spread over 2K-1 adjacent subcarriers in order to give:

$$\bar{d}_{i,k}[n]=d_i[n]G_k, \quad k=-K+1,\ldots,0,\ldots K-1 \quad (1)$$

The module for frequency spreading and filtering by the protype filter is designated 220. It will be understood that this operation is equivalent to that of the filtering by the synthesis filters 133 in the temporal implementation.

Figure 3A:
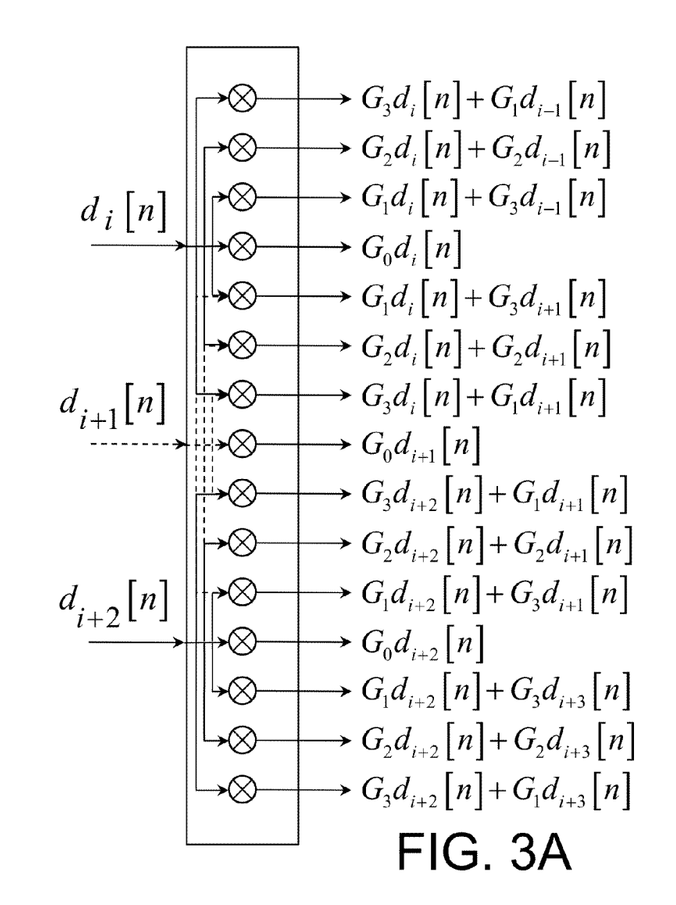
FIG. 3A illustrates a spectral spread effected upstream of the IFFT in FIG. 2.

The data with the same parity i and i+2 are separated spectrally and those of opposite parities i and i+1 overlap as shown in FIG. 3A. This overlap does however not give rise to any interference since two data of opposite parities are necessarily respectively situated on the real axis and the imaginary axis. For example, in FIG. 3A, the data $d_i[n]$ and $d_{i+2}[n]$ are real values (shown in continuous lines) whereas the data item $d_{i+1}[n]$ is an imaginary value (shown by broken lines).

The frequency-spread and filtered data are then the subject of an IFFT of size KN at 230. It should be noted that the size of the IFFT is extended by a factor K compared with that in FIG. 1, the filtering by the synthesis filters here being done upstream of the IFFT, in the frequency domain.

Figure 4:
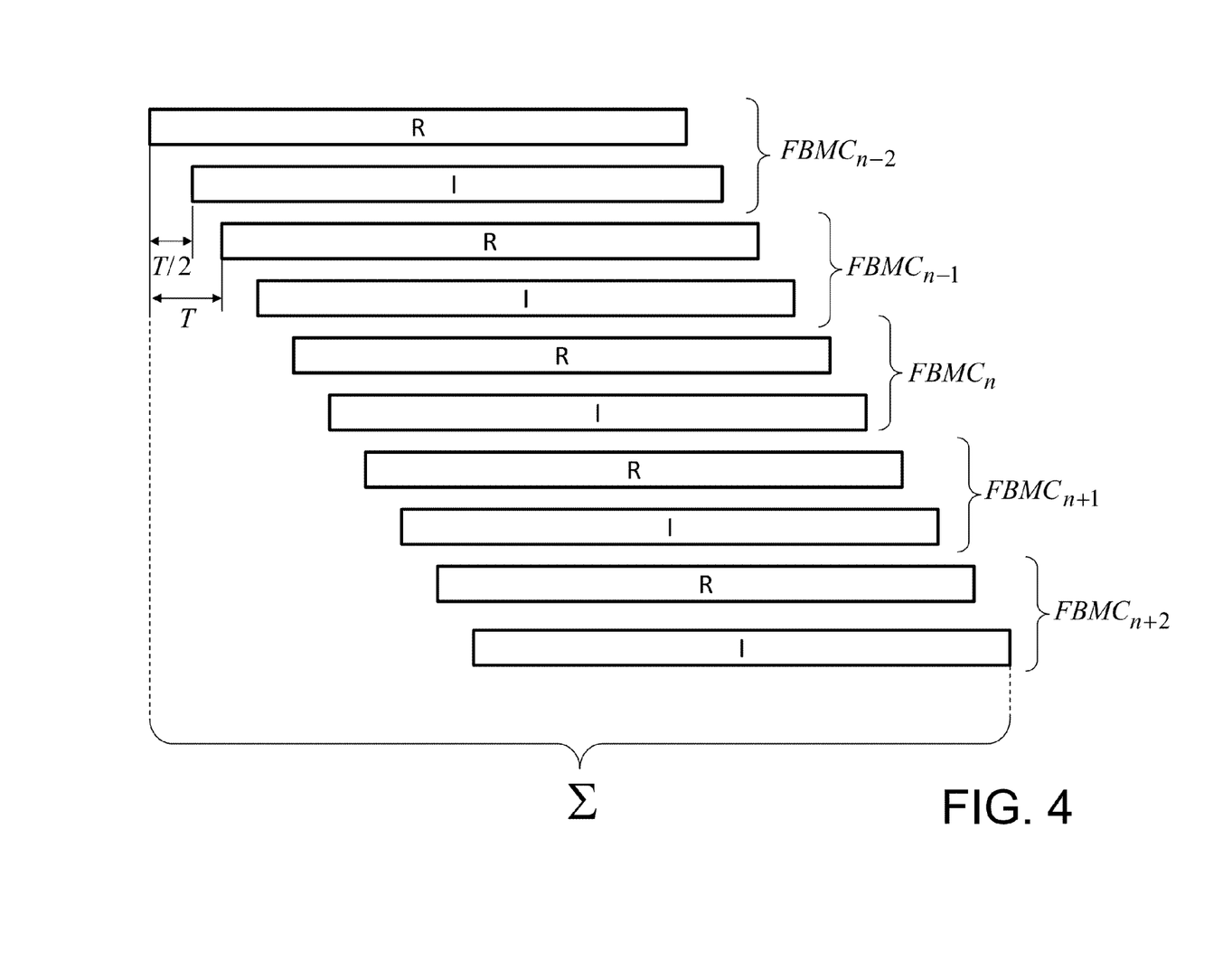
FIG. 4 illustrates the combination of FBMC symbols in FIG. 2.

The ouputs of the IFFT are then combined in the comination module 240 as indicated in FIG. 4. All the samples output from the the IFFT represent an FBMC symbol in the time domain, since the real part and the imaginary part of this symbol are offset by T/2. The FBMC symbols having a duration KT and following each other at the rate f=1/T, an FBMC symbol is combined in the module 240 with the preceding K/2 FBMC symbols and following K/2 FBMC symbols.

It should be noted that the combination operation at 240 is equivalent to the one occuring in the synthesis filters in FIG. 1.

The signal thus obtained is then translated at the carrier frequency.

After transmission over the channel 250, the received signal, demodulated in baseband, is sampled by the receiver at the rate Nf.

A sliding FFT (the window of the FFT sliding by KT between two FFT calculations) of size KN is effected in the FFT module, 260, on blocks of KN consecutive samples.

Figure 3B:
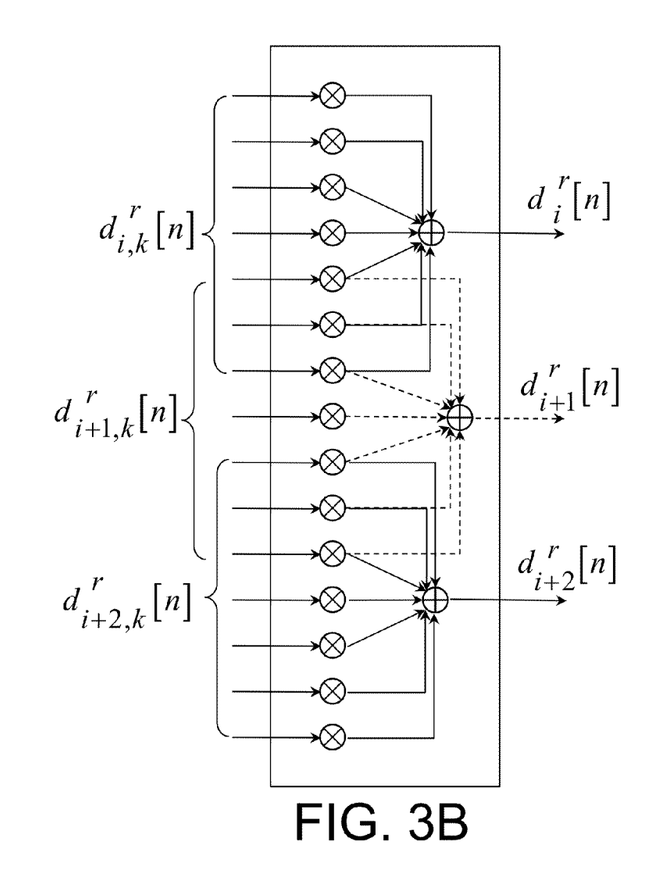
FIG. 3B illustrates the spectral de-spreading performed downstream of the FFT in FIG. 2.

The outputs of the FFT are then subjected to a filtering and a spectral de-spreading in the module 270. The de-spreading operation takes place in the frequency domain as shown in FIG. 3B. More precisely, the samples $\check{d}_{i,k}^r[n]$, $k=-K+1, \ldots, 0, \ldots K-1$ corresponding to the 2K−1 frequencies $(i-1)K+1, \ldots iK, \ldots (i+1)K-1$ of the FFT are multiplied by the values of the the transfer function of the analysis filter (translated in frequency from that of the prototype filter) at the frequencies in question and the results obtained are added, that is to say:

$$d_i^r[n] = \sum_{k=-K+1}^{K-1} G_k \check{d}_{i,k}^r[n] \quad (2)$$

It should be noted that, as in FIG. 3A, obtaining data having ranks of the same parity, for example $d_i^r[n]$ and $d_{i+2}^r[n]$ use blocks of separate samples whereas those of two consecutive ranks, of opposite parities, overlap. Thus obtaining the data item $d_{i+1}^r[n]$ uses the samples $\check{d}_{i,k}^r[n] k=1, \ldots, K-1$ and the samples $\check{d}_{i-2,k}[n]$, $k=-K+1, \ldots, 1$.

The de-spreading of real data is shown by continuous lines whereas the de-spreading of imaginary data is shown by broken lines.

It is also important to note that filtering by the analysis filters is here performed in the frequency domain, downstream of the FFT, unlike the embodiment in FIG. 1.

The data $d_i^r[n]$ thus obtained are then supplied to a post-processing module 280, effecting the processing that is the reverse of that of the module 210, in other words an OQAM demodulation.

One of the problems encountered in FBMC systems is compensating for the carrier frequency offset at the receiver. This is because, when there is a frequency offset between the carrier frequency of the transmitter and the demodulation frequency of the receiver, the samples at the input of the FFT module are affected by a phase rotation that must be compensated for.

An FBMC receiver with carrier frequency offset compensation was proposed in the article by T H Stitz et al entitled "CFO estimation and correction in a Wi-MAX-like FBMC system" published in Signal Processing Advances in Wireless Communications, 2009, SPAWC '09, pp 633-637. However, this FBMC receiver does not make it possible to effect an offset compensation on the upstream connection except in a single-user context. This is because, when several terminals share the subcarrier multiplex in order to transmit to a base station, it is not possible to compensate individually and independently for the offsets between the demodulation frequency of the receiver (of the base station) on the one hand and the carrier frequencies of the various transmitters (of the terminals) on the other hand. Furthermore, the offset compensation that is proposed is a simple multiplication by a phase factor. It does not make it possible to compensate for the interference between sub-channels when the frequency offset can no longer be ignored with regard to the difference in frequency, $\Delta F_c=1/T$, between these sub-channels.

A first objective of the present invention is consequently to propose an FBMC receiver making it possible to effect a compensation for offset including when the latter is sufficiently great to give rise to interference between sub-channels. A second objective of the present invention is to enable a compensation for offset on the upstream connection when several terminals share access by division of the sub-carrier multiplex.

DISCLOSURE OF THE INVENTION

The present invention is defined by an FBMC signal receiver synthesised by means of a bank of N synthesis filters having an overlap factor K, said receiver comprising:

an FFT module of size KN in order to effect an FFT on a block of KN samples of said signal, after baseband demodulation, and to supply a block of KN samples in the frequency domain, corresponding to KN subcarriers:

a filtering module per bank of N analysis and spectral de-spreading filters in the frequency domain, said receiver also comprising:

an estimator for estimating the carrier frequency offset between the carrier frequency of the signal and the baseband demodulation frequency of the receiver;

a shift module, downstream of the FFT module, shifting the samples at the output of the FFT by a predetermined number of samples according to the carrier frequency offset estimated by said estimator;

an interference reduction filter in order to reduce the interference between subcarriers by means of a multiplication by a matrix (W) having a band of non-zero coefficients of width 2Q+1, around the main diagonal, with Q<K, and zeroes everywhere else, said interference reduction filter operating on blocks of samples at the output of the shift module and supplying them to the filtering and spectral de-spreading module.

Said predetermined number of samples is advantageously obtained as the integer part of a normalised offset defined as the ratio of $\delta\hat{F}$ by $\Delta F_c/K$ where $\delta\hat{F}$ is the carrier frequency offset estimated by the carrier frequency estimator and $\Delta F_c/K$ is the frequency spacing between subcarriers.

According to a first variant, the matrix of the interference filter is defined by:

$$W = F^H \overline{C}^H F$$

where F is the Fourier matrix of size KN×KN, $\overline{C}$=Diag $(\overline{c}_0, \ldots, \overline{c}_{KN-1})$ with $$\overline{c}_p = \exp\left(2\pi j \frac{p\hat{P}}{N}\right),$$

$p=0, \ldots, NK-1$ where P is the fractional part of the normalised offset divided by K.

According to a second variant, the matrix of the interference filter is defined by:

$$W = \frac{S/N}{S/N+1}(F^H \cdot \overline{C}^H \cdot F)$$

where S/N is the signal to noise ratio at the receiver, F is the Fourier matrix of size KN×KN, $\overline{C}$=Diag($\overline{C}_O, \ldots, \overline{C}_{KN-1}$) with $$\overline{c}_p = \exp\left(2\pi j \frac{p\hat{r}}{N}\right),$$

P=0, ..., NK−1 where P is the fractional part of the normalised offset divided by K.

Preferably, the interference filter consists of a plurality (E) of elementary filters in a cascade, separated by multiplexers, each multiplexer being able to select the input or output of an elementary filter, each elementary filter effecting a matrix multiplication with a matrix $\overline{W}^i$ defined by $\overline{W}^i = F^H \cdot \text{Diag}(\overline{W}_O, \ldots, \overline{W}_{KN-1})^H \cdot F$ where $$\overline{w}^i_p = \exp\left(\pi j \frac{p}{2^{i-1}N}\right),$$

p=0, ..., NK−1.

Each elementary filter can be provided with an inversion control, said inversion control effecting a conjugation of the coefficients of the matrix $\overline{W}^i$ and a symmetry with respect to the main diagonal.

Preferably, the offset estimator determines the fractional part P of the division of the carrier frequency offset $\hat{\delta r}$ by the frequency spacing between subcarriers, $\Delta F_C/K$, divided by K, and effects an approximation thereof by means of a dyadic decomposition $$\hat{r} = \sum_{i=1}^{E} \frac{r_i}{2^i}, r_i \in \{-1, 0, +1\},$$

the multiplexer of rank i short-circuiting the elementary filter of rank i if $r_i=0$ and activating its inversion control if $r_i=-1$.

The FBMC signal receiver may further comprise a channel equaliser in the frequency domain operating on the blocks of samples output from the interference reduction filter, the channel equaliser being situated downstream of the interference filter and upstream of the filtering and spectral de-spreading module.

Each block of samples output from the FFT or from the shift module or from the interference reduction filter is advantageously multiplied by means of a multiplier by a phase factor $e^{-j\hat{\phi}_n}$ where n is the index of the block, $\hat{\phi}_n = 2\pi n \hat{\delta r} \cdot T$ where $\hat{\delta r}$ is the carrier frequency offset estimated by the carrier frequency offset estimator and T is the interval between FBMC symbols.

It may also comprise a post-processing module effecting an OQAM demodulation on the blocks of samples output from the filtering and spectral de-spreading module.

The present invention further concerns a method for the compensation of carrier frequency offset in an FBMC signal receiver, said FBMC signal being synthesised by means of a bank of N synthesis filters having an overlap factor K, said receiver effecting:

an FFT of size KN on a block of KN samples of said signal, after base-band demodulation, in order to supply a block of KN samples in the frequency domain, corresponding to KN subcarriers, a filtering by a bank of N analysis filters followed by a spectral de-spreading in the frequency domain, said offset compensation method further comprising:

an estimation of the carrier frequency offset between the carrier frequency of the signal and the base-band demodulation frequency of the receiver;

an offsetting of the samples at the output of the FFT in order to recover a block of samples offset by a predetermined number of samples, said number being obtained from the previously estimated carrier frequency offset;

an interference filtering between subcarriers effected by multiplication of the block thus offset with a matrix having a band of non-zero coefficients, with a width 2Q+1, around the main diagonal, with Q>K, and zeroes everywhere else.

Said predetermined number of samples is advantageously obtained as the integer part of a normalised offset, defined as the ratio of $\hat{\delta r}$ to $\delta F_C/K$ where $\hat{\delta r}$ is the carrier frequency offset estimated by the carrier frequency offset estimator and $\Delta F_C/K$ is the frequency spacing between subcarriers.

According to a first variant, the matrix of the interference filter is defined by:

$$W = F^H \overline{C}^H F$$

where F is the Fourier matrix of size KN×KN, $\overline{C}$=Diag($\overline{C}_O, \ldots, \overline{C}_{KN-1}$) with $$\overline{c}_p = \exp\left(2\pi j \frac{p\hat{r}}{N}\right),$$

p=0, ..., NK−1 where P is the fractional part of the normalised offset divided by K.

According to a second variant, the matrix of the interference filter is defined by:

$$W = \frac{S/N}{S/N+1}(F^H \overline{C}^H F)$$

where S/N is the signal to noise ratio at the receiver, F is the Fourier matrix of size KN×KN, $\overline{C}$=Diag($\overline{C}_O, \ldots, \overline{C}_{KN-1}$) with $$\overline{c}_p = \exp\left(2\pi j \frac{p\hat{r}}{N}\right),$$

p=0, ..., NK−1 where P is the fractional part of the division of the normalised offset divided by K.

The filtering operation advantageously comprises a plurality (E) of elementary filtering operations in a cascade, each filtering operation being able to be short-circuited and comprising a matrix multiplication with a matrix $\hat{W}^i$ defined by $\hat{W}^i = F^H \cdot \text{Diag}(\hat{W}_O^i, \ldots, \hat{W}_{KN-1}^i)^H \cdot F$ where $$\overline{w}^i_p = \exp\left(\pi j \frac{p}{2^{i-1}N}\right),$$

p=0, ..., NK−1

BRIEF DESCRIPTION OF THE DRAWINGS

Other features and advantages of the invention will emerge from a reading of preferential embodiments of the invention, with reference to the accompanying drawings, among which.

DETAILED DISCLOSURE OF PARTICULAR EMBODIMENTS

We shall consider hereinafter an FBMC receiver implemented in the frequency domain, as described in relation to FIG. 2. The idea at the basis of the invention is to effect in an original manner the correction of offset in the frequency domain, at the output of the FFT.

It will be assumed first of all that the receiver receives FBMC symbols only from one user (the case of the downstream connection for example or of a single user on the upstream connection).

The signal received by the receiver, after base-band demodulation, is sampled at the frequency Nf and the samples obtained are subjected to a sliding FFT, of size KN, where N is the number of sub-channels (or in an equivalent manner the number of synthesis/analysis filters) and K is the overlap factor of the FBMC transmitter.

$d_n$ means the vector of the data, or more precisely the vector of the OQAM symbols $d_i[n]i=0, \ldots, N-1$, transmitted by the transmitter, that is to say $d_n = (d_O[n], \ldots, d_{N-1}[n])^T$.

The samples output from the FFT can be expressed in the form of a vector of size KN, denoted $Y_n = (Y_O[n], \ldots, Y_{KN-1}[n])^T$, such that:

$$Y_n = \left(\sum_{k=-K+1}^{K-1} d_{n+k} G\right) H_n + Z_n \qquad (3)$$

where G is the matrix of size N×KN defined by:

$$G = \begin{pmatrix} G_{-K+1} & \ldots & G_0 & \ldots & G_{K-1} & \ldots & 0 & \ldots & 0 \\ 0 & \ldots & G_{-K+1} & \ldots & G_0 & \ldots & G_{K-1} & \ldots & 0 \\ \vdots & \ddots & \ddots & \ddots & \ddots & \ddots & \ddots & \ddots & \vdots \\ 0 & \ldots & \ldots & 0 & G_{-K+1} & \ldots & G_0 & \ldots & G_{K-1} \end{pmatrix}$$

where the coefficients $G_k$, k=0, ..., K-1 are the values of the transfer function of the prototype filter at the frequencies k/KT, with $G_{-k}=G_k$. The sum $$\left(\sum_{k=-K+1}^{K-1} d_{n+k} G\right)$$

reflects the combination (in the time domain) of the FBMC symbol $d_n$ with the previous K-1 FBMC symbols and the following K-1 FBMC symbols, as effected by the module 240. $H_n$ is a diagonal matrix of size KN×KN giving the coefficients of the transmission channel at the KN frequencies of the FFT and $Z_n$ is the noise vector, of size KN.

Given that the analysis filtering and the spectral de-spreading in the module 270 (at the output of the FFT) make it possible to separate the various sub-channels, we can merely consider the contribution due to the data vector $d_n$:

$$Y_n = d_n G H_n = Z_n \qquad (4)$$

If the vector of size KN of the samples at the input of the FFT module is denoted $Y_n = (y_O[n], \ldots, y_{KN-1}[n])^T$, this gives the equation:

$$Y_n = F y_n \qquad (5)$$

where F is the Fourier matrix of size KN×KN the elements of which are given by $F[p,m]=\exp(-j2\pi pm/(NK))$, p=0, ..., KN-1, m=0, ..., KN-1.

An offset of δF between the carrier frequency of the transmitter and the demodulation frequency of the receiver results in the time domain in the multiplication of each of the samples by a phase turn. More precisely, a sample $y_p[n]$ at the input of the FFT becomes, when there is an offset δF:

$$\tilde{y}_p[n] = y_p[n]\exp(j2\pi n\delta FT)\exp\left(j2\pi p\delta F\frac{T}{N}\right)\exp(j\varphi) \qquad (6)$$

This is because the first multiplying term represents the phase rotation affecting the $n^{th}$ FBMC symbol, the second multiplying term represents the phase rotation affecting the $p^{th}$ sample of this symbol and the third multiplying term is a phase at the origin.

The carrier frequency offset can be expressed in the form of an integer multiple of the spacing between subcarriers $\Delta F_C/K=1/(KT)$ and a remainder less than $\Delta F_C/K$, hereinafter referred to as the residue, that is to say:

$$\frac{\delta F}{\Delta F_c} = q/K + r \qquad (7)$$

where $q \in \mathbb{Z}$ and r is a real number such that $r \in [-1/(2K), 1/(2K)[$.

The sample $\tilde{y}_p[n]$ received when there is an offset can then be rewritten more simply:

$$\tilde{y}_p[n] = y_P[n]\exp(j\phi_n)c_P \quad (8)$$

where the first multiplying term is a phase rotation $\phi_n = 2\pi n \delta F \cdot T$ that affects identically all the samples of the FBMC symbol whereas the second term $$c_P = \exp\left(2\pi j \frac{p}{NK}(q+rK)\right),$$

$p=0, \ldots, KN-1$, affects the samples of the symbol differently. The term $\exp(j\phi)$ has not been repeated since it is compensated for by the equalisation of the channel (simple phase shift between the transmitter and receiver).

When the FFT is effected on the samples $\tilde{y}_P[n]$, $P=0, \ldots, KN-1$ the term $\exp(j\phi_n)$ is common to the whole of the symbols so that the vector $\tilde{Y}_n$ of the samples output from the FFT module can be expressed by:

$$\tilde{Y}_n = e^{j\phi_n} Y_n C \quad (9)$$

where C is the matrix of size $KN \times KN$ defined by:

$$C = F\text{Diag}(C_O, \ldots, C_{KN-1})F^H \quad (10)$$

It will be understood in fact that the matrix C performs the equivalent in the frequency domain of the operation of multiplying the samples $y_p[n]$ in the time domain. This multiplication in the time domain is represented by a convolution in the frequency domain, which confers on the matrix C a Toeplitz structure:

$$C = \begin{pmatrix} C_0 & C_{-1} & \ldots & C_{-NK+1} \\ C_1 & C_0 & \ddots & \vdots \\ \vdots & \ddots & \ddots & C_{-1} \\ C_{NK-1} & \ldots & C_1 & C_0 \end{pmatrix} \quad (11)$$

where the coefficients $C_i$, $\ell=-NK+1, \ldots, 0, NK-1$ can be obtained from (10), that is to say:

$$C_i = \exp(2\pi j(KN-1)(K\delta F - \ell)/(KN)) \frac{\text{sinc}(K\delta F - \ell)}{\text{sinc}((K\delta F - \ell)/(KN))} \quad (12)$$

and where sinc(.) designates the cardinal sine.

Apart from the multiplying term $e^{j\phi_n}$, the effect of the offset shift in the frequency domain is given by the matrix C.

It will be understood that the non-diagonal terms of the matrix C give rise to an interference between subcarriers (ICI) or even an intersymbol interference (ISI) if the frequency offset is not insignificant compared with the spacing between sub-channels $$\left(\delta F > \frac{\Delta F_c}{2}\right).$$

Furthermore, the diagonal terms are less than 1 in absolute value ($|C_O|<1$), which leads to an attenuation of the useful signal.

It has been possible to check by simulation that the diagonal terms of the matrix C are no longer the preponderant terms when $$\delta F > \frac{\Delta F_c}{2K}.$$

This will be understood intuitively since the frequency offset then leads to a frequency sliding on the adjacent subcarrier (within the spread interval) spaced apart by $$\frac{\Delta F_c}{K}$$

with respect to the centre of the sub-channel.

In general terms, the matrix C comprises a sub-diagonal (which may be the diagonal itself for low offset values), the coefficients of which are preponderant, and coefficient values which decrease rapidly on either side thereof. In other words, the interference generated by a subcarrier affects only a small number of subcarriers.

The effect of the offset can be broken down into a frequency translation, that is to say an offset of the samples at the output of the FFT, and a disturbance of the adjacent subcarriers.

The present invention takes advantage of this breakdown in order to effect the offset compensation.

Figure 5:
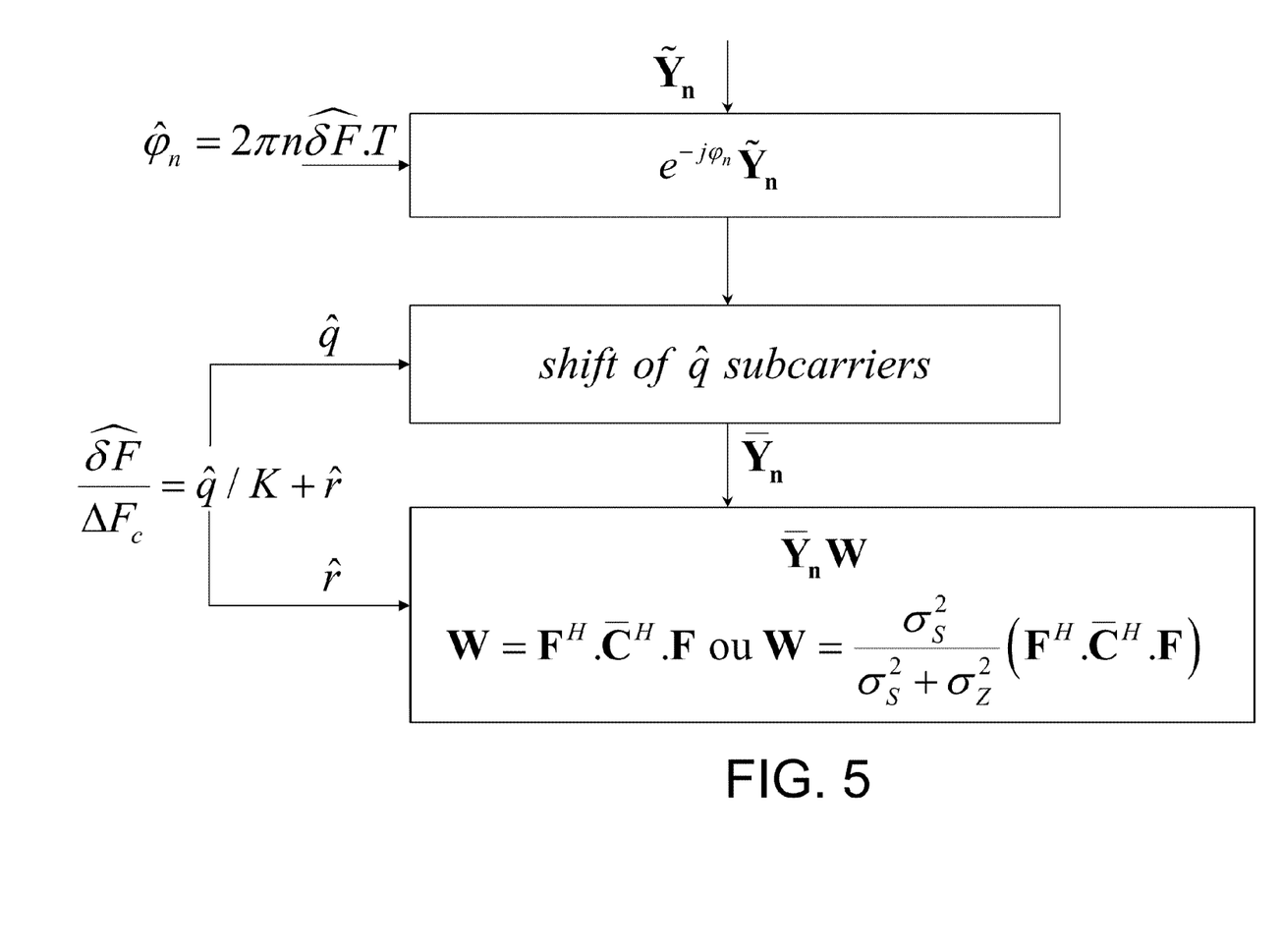
FIG. 5 shows schematically a method for compensating for carrier frequency offset in an FBMC receiver, according to one embodiment of the invention.

FIG. 5 depicts schematically the method of compensation for offset of the carrier frequency according to one embodiment of the invention.

It is assumed that the FBMC receiver has previously estimated the carrier frequency offset $\delta F$. This estimation, $\widehat{\delta F}$ may for example be obtained by means of a pilot sequence, in a manner known per se. Furthermore, knowing the spacing between sub-channels $\Delta F_C$ and the overlap factor K, an estimation of q and r satisfying (7) is deduced therefrom. In other words $\hat{q}$ and $\hat{r}$ are calculated such that the estimated offset, normalised by the inter-carrier spacing $$\delta = \frac{\widehat{\delta F}}{\Delta F_c / K} = \hat{q} + K\hat{r} \text{ with } |\hat{r}| < \frac{1}{2K}.$$

$\hat{q}$ is the integer part of the estimated and normalised offset and the residue $\hat{r}$ is the fractional part thereof, divided by K.

At step 510, samples output from the FFT module of size KN are available at the FBMC receiver. A correction is applied to each of the samples by means of a multiplication by the same phase term, that is to say $$e^{-j\hat{\phi}_n}\tilde{y}_p[n], p=0, \ldots, KN-1 \quad (13)$$

where $\hat{\phi}_n = 2\pi n \widehat{\delta F} \cdot T$.

At step 520, an offset of the samples is made by a number $\hat{q}$ of subcarriers. In other words, the first sample is recovered at the $\hat{q}^{th}$ subcarrier. In practice, guard areas are used at the ends of the baseband, so that it is possible to ignore the edge effects up to a maximum offset, corresponding to a value $\hat{q}_{max}$.

The samples obtained after multiplication at 510 and offset at 520 are denoted $\bar{y}_p[n]$ and the vector of these samples is denoted $\bar{Y}_n = (\bar{y}_O[n], \ldots, \bar{y}_{KN-1}[n])^T$.

At step 530, a reduction of the interference between subcarriers is effected by calculating the product $\bar{Y}_n W$ where:

$$W = F^H \bar{C}^H F \quad (14)$$

with $\bar{C}=\text{Diag}(\bar{C}_O, \ldots, \bar{C}_{KN-1})$ and $$\bar{c}_p = \exp\left(2\pi j \frac{p\hat{r}}{N}\right), \quad p = 0, \ldots, NK-1.$$

In other words the matrix $\bar{C}$ corresponds to the matrix $C_i$ re-centred on the main diagonal. This re-centring is enabled by the compensation performed at step 520. The matrix W is, like the matrix $C_i$ a Toeplitz matrix with 2Q+1 non-zero elements per column with Q<K. In other words, the matrix W has a band of width 2Q+1 non-zero elements centred on the main diagonal with Q<K.

Since $FF^H=I$ and $\bar{C}\bar{C}^H=I$, it will be understood that steps 520 and 530 are equivalent to a multiplication of the vector $e^{-j\Phi_n}\bar{Y}_n$ by the matrix $C^{-1}$. This reduction in interference is consequently of the ZF (Zero Forcing) type. Alternatively, in order to avoid an increase in noise, it is possible to effect a reduction in interference of the MMSE (Minimum Mean Square Error) type corresponding to minimisation of the square error $=Y_n-\bar{Y}_n W=^2$. The matrix W corresponding to the MMSE criterion is given by:

$$W = \frac{\sigma_s^2}{\sigma_s^2 + \sigma_z^2}(F^H \bar{C}^H F) = \frac{S/N}{S/N+1}(F^H \bar{C}^H F) \quad (15)$$

where $\sigma_s^2$ is the power of the signal and ohd $z^2$ the power of the noise and where S/N is the signal to noise ratio.

At the end of step 530, whatever the interference reduction criterion (ZF or MMSE) adopted, the samples given by the vector can be subjected to an equalisation in the frequency domain in order to compensate for the effects of the channel (represented by the matrix $H_n$ in equation (4)). This equalisation is achieved via a channel estimation supplying the coefficients of the matrix $H_n$, in a manner known per se.

After equalisation of the subcarriers, the samples are subjected to a filtering operation by the prototype filter in the frequency domain and to a de-spreading operator as described in relation to the module 270 in FIG. 2.

A person skilled in the art will understand that the offset compensation proposed compensates for large carrier frequency offsets compared with the frequency spacing between adjacent sub-channels.

Figure 6:
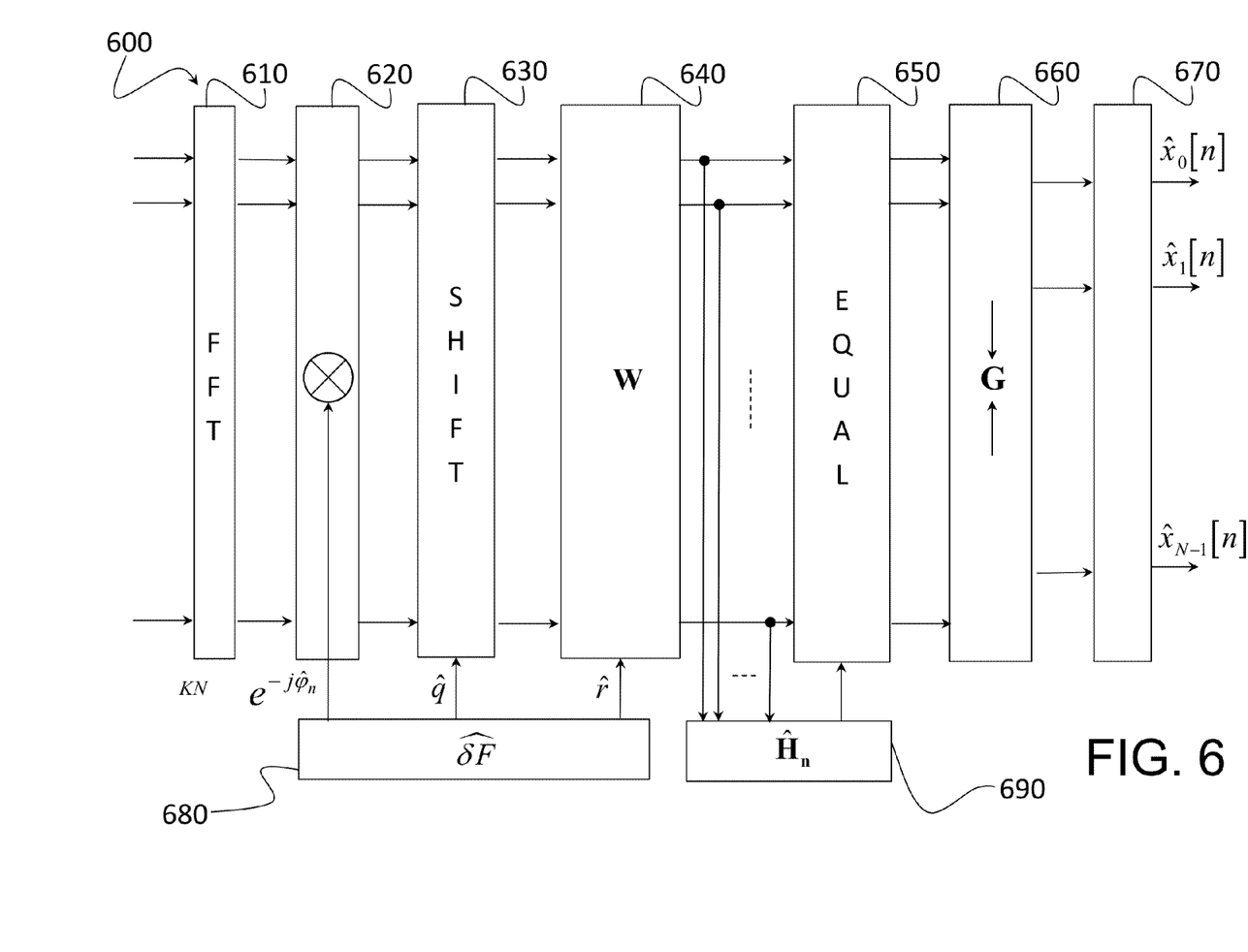
FIG. 6 depicts schematically an FBMC receiver with carrier frequency offset compensation according to a first embodiment of the invention.

FIG. 6 depicts an FBMC receiver, 600, with carrier frequency offset compensation, according to a first embodiment of the invention.

As in the FBMC receiver of FIG. 2, after base-band demodulation, the received signal is sampled at the frequency rate Nf and the samples obtained are subjected to a sliding FFT, of size KN, in the FFT module 610. It will recalled that N is the number of sub-channels and K is the overlap factor.

The vector of KN samples, $\tilde{y}_n$, is transformed by the FFT module 610 into a vector $\hat{Y}_n = F\tilde{y}_n$.

The sample vector is then multiplied by the phase factor $e^{-j\Phi_n}$, in the multiplier 620, and offset by $\hat{q}$ subcarriers in the offset module 630. The vector $\bar{Y}_n$ obtained at the output of the module 630 is next subjected to an operation of reduction of interference between the subcarriers generated by the carrier frequency offset. This operation is performed at 640 by a filtering in the frequency domain by means of the multiplication by the matrix W, this being able to have the form (14) or (15) according to the ZF or MMSE criterion adopted.

It should be noted that the multiplication by the phase factor $e^{-j\Phi_n}$ at 620 can alternatively be implemented at the output of the shift module 630 or even at the output of the interference reduction filter 640.

The vector output from the interference reduction filter, 640, $\bar{Y}_n W$ can be subjected to a channel equalisation, in the frequency domain, by means of an equaliser 650. There also, the equalisation can be performed in accordance with a ZF or MMSE criterion.

The vector of the samples thus equalised is finally supplied to a filtering module by a battery of analysis and spectral de-spreading filters 660 identical to the module 270 in FIG. 2.

At the output of the filter/de-spreading module 660, a vector of size N is obtained that is processed in the post-processing module 670 (OQAM demodulation) in order to recover the data transmitted by the transmitter.

It should be noted that the multiplication by the phase factor $e^{-j\Phi_n}$ at 620 can alternatively occur at the output of the offset module 630 or at the output of the interference reduction module 640.

The receiver 600 also comprises a carrier frequency offset frequency estimator 680 calculating an estimation $\hat{\delta r}$ of the offset. The estimator 680 may for example estimate the offset by analysing the phase difference between two pilot signals of the same FBMC symbol, situated on two successive subcarriers.

In addition, it supplies the phase factor $e^{-j\Phi_n}$ to the multiplier 620 for each vector $\bar{Y}_n$, the value $\hat{q}$ to the offset module 630 and the value $\hat{r}$ to the filtering module 640.

Finally, a channel estimator 690 estimates the channel coefficients on the various subcarriers and deduces therefrom the equalisation coefficients. These equalisation coefficients are transmitted to the equalisation module 650. The estimation of the channel coefficients on the various subcarriers can be done conventionally by means of pilot symbols.

The advantage of such an FBMC receiver is to be able to effect a carrier frequency offset compensation when it simultaneously receives FBMC signals from several transmitters, in particular in the context of use on the upstream connection of a cellular system.

Figure 7:
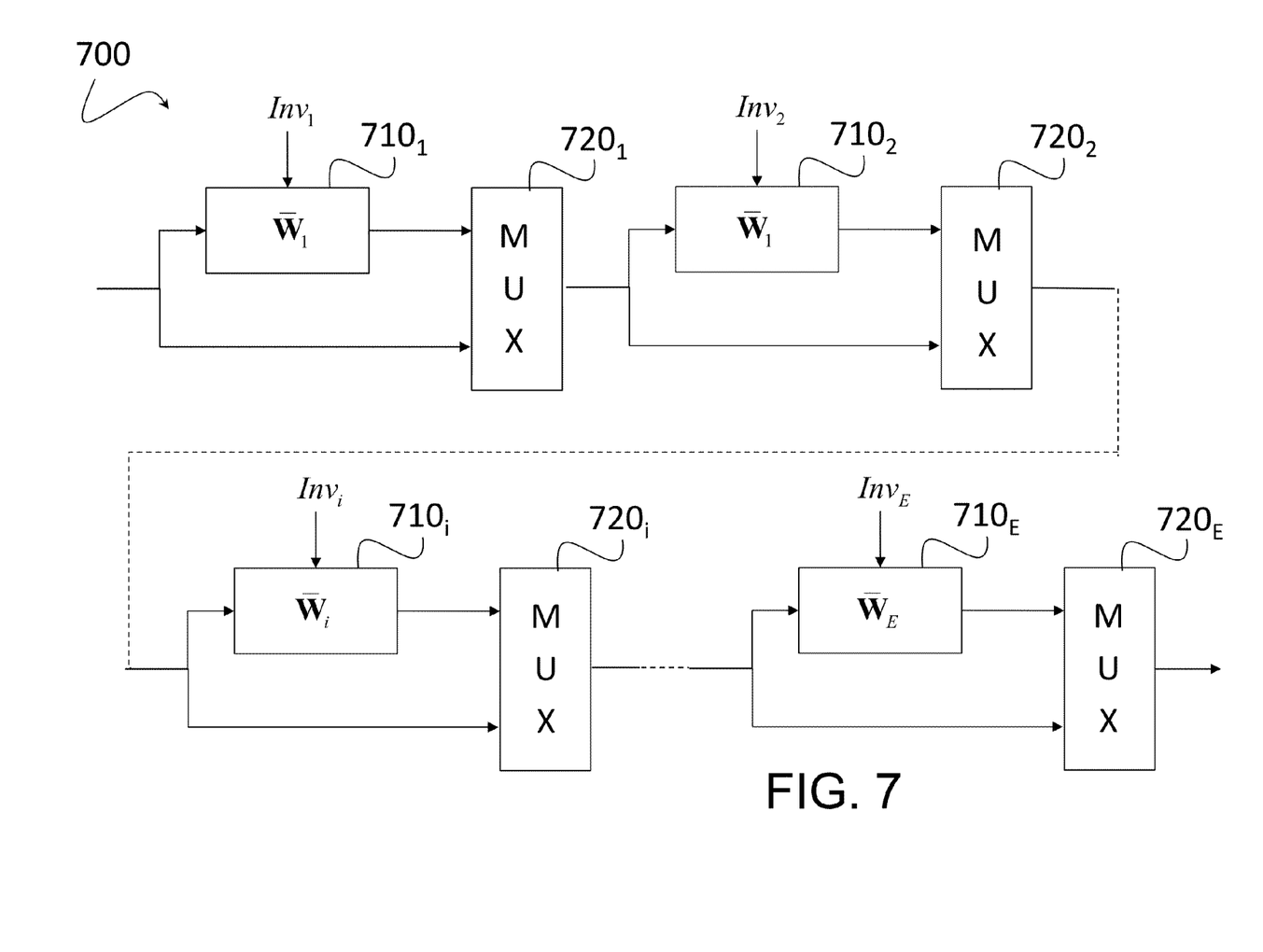
FIG. 7 depicts schematically an advantageous embodiment of the interference reduction filter of the FBMC receiver of FIG. 6.

FIG. 7 depicts an advantageous embodiment of the interference reduction filter of FIG. 6.

It will be recalled that the filtering carried out by the filter 640 effects, in the case of a ZF filtering, a matrix multiplication by means of the matrix $W=F^H \text{Diag}(\bar{C}_O, \ldots, \bar{C}_{KN-1})^H F$ with $\bar{C}=\text{Diag}(\bar{C}_O, \ldots, \bar{C}_{KN-1})$ and $$\bar{c}_p = \exp\left(2\pi j \frac{p\hat{r}}{N}\right), \quad p = 0, \ldots, NK-1.$$

The residue $\hat{r}$ is a real number between $$-\frac{1}{2K} \text{ and } \frac{1}{2K}.$$

It can be approximated by a dyadic decomposition with a maximum error $1/2^{E+1}$:

$$\hat{r} \simeq \sum_{i=1}^{E} \frac{r_i}{2^i} \quad (16)$$

where $r_i$, i=1, E are integer values equal to 0, 1 or −1. In practice, the overlap factor is chosen as being a power of 2, $K=2^k$, and consequently $r_i=0$, i=1, ..., K.

Instead of calculating the matrix W for each new offset and therefore each new residue value $\hat{r}$, it is advantageous to precalculate a plurality of matrices corresponding to the dyadic decomposition base. This is because it will be noted that, if $$\hat{r} = \sum_{i=1}^{E} \frac{r_i}{2^i}; \quad W = \prod_{i=1}^{E} W^i \text{ avec} \quad (17)$$

$$W^i = F^H \text{Diag}(w_0^i, \ldots, w_{KN-1}^i)^H F$$

$$\text{where } w_p^i = \exp\left(\pi j \frac{p r^i}{2^{i-1} N}\right),$$

$$p = 0, \ldots, NK-1, i = 1, \ldots, E.$$

The interference reduction filter 700 is composed of a series of elementary filters in cascade $710_1, \ldots, 710_Q$.

The elementary filter $710_i$ effects a matrix multiplication of its input vector by the matrix $\overline{W}^i$ defined, in the ZF case, by:

$$\overline{W}^i = F^H \text{Diag}(\overline{W}_0^i, \ldots, \overline{W}_{KN-1}^i)^H F \quad (18)$$

with $$\overline{w}_p^i = \exp\left(\pi j \frac{p}{2^{i-1} N}\right), p = 0, \ldots, NK-1.$$

The matrices $\overline{W}^i$, $i=1, \ldots, E$ are calculated once and for all. As seen above, since these matrices are Toeplitz matrices, the filters each require only $2Q+1$ coefficients. The total number of coefficients to be stored is consequently $E(2Q+1)$.

Similarly, a person skilled in the art will understand that an interference reduction filter of the MMSE type can be decomposed in the form of elementary filters defined by expression (18), the scale factor of (15) being applied independently of these filters.

The elementary filters are separated by multiplexers $720_i$ that make it possible to select the input or output of the elementary filters $730_i$. Thus each multiplexer $720_i$ makes it possible to short-circuit or not the filtering by the elementary filter $730_i$ depending on whether or not $r^i$ is zero.

In addition, each elementary filter is provided with an inversion control $\text{Inv}_i$. If the offset residue is negative, and therefore $r^i = -1$, the inversion control $\text{Inv}_i$ is activated. The coefficients of the elementary filter are then simply conjugated and permuted (by means of a symmetry with respect to the diagonal of the matrix $\overline{W}^i$). Naturally the conjugated and permuted coefficients can be stored in advance, so that the inversion control simply selects the first or second set of coefficients.

The commands of the multiplexers and the inversion controls can be directly controlled by the offset estimation module 680.

Figure 8:
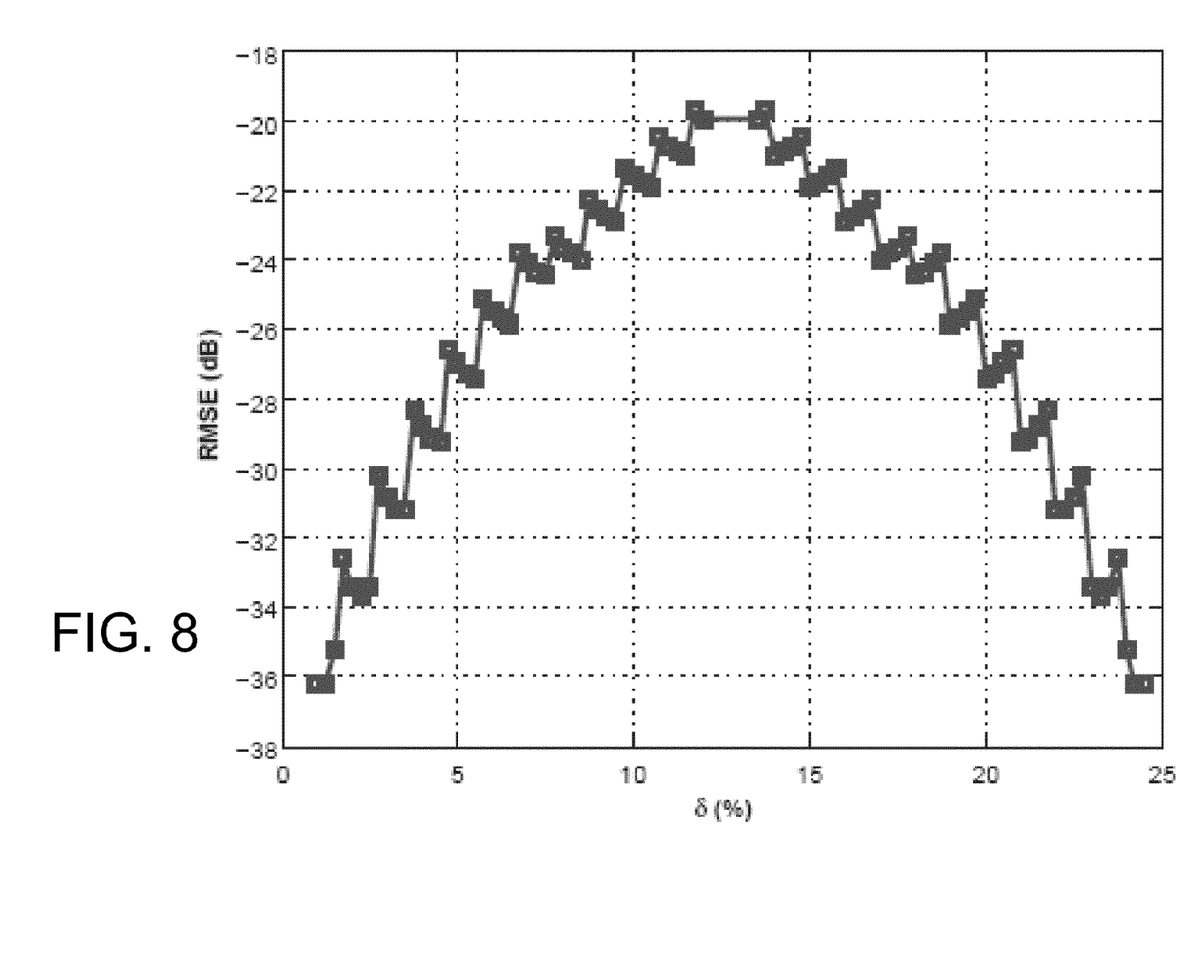
FIG. 8 illustrates the performance of the offset compensation in the FBMC receiver of FIG. 6 using the interference reduction filter of FIG. 7.

FIG. 8 shows the performance of the offset compensation by the receiver FBMC of FIG. 6 when the interference reduction filter of FIG. 7 is used.

The performance of the compensation has been shown in the form of a Root Mean Square Error or RMSE compared with a perfect compensation (nil offset), according to the normalised offset $$\delta = \frac{\delta F}{\Delta F_c / K}.$$

The FBMC system in question uses N=64 sub-channels and a degree of overlap of K=4. The simulation was performed for a number E=4 of elementary filters and for a perfect phase correction. It should be noted that, when $\delta$ exceeds 12.5%

$$\left(\text{that is to say } \frac{1}{2K}\right),$$

an offset of q=1 subcarrier must be performed. The oscillations of the curve are due to the quantisation step of the dyadic composition $$\frac{1}{(2^E)}.$$

Figure 9:
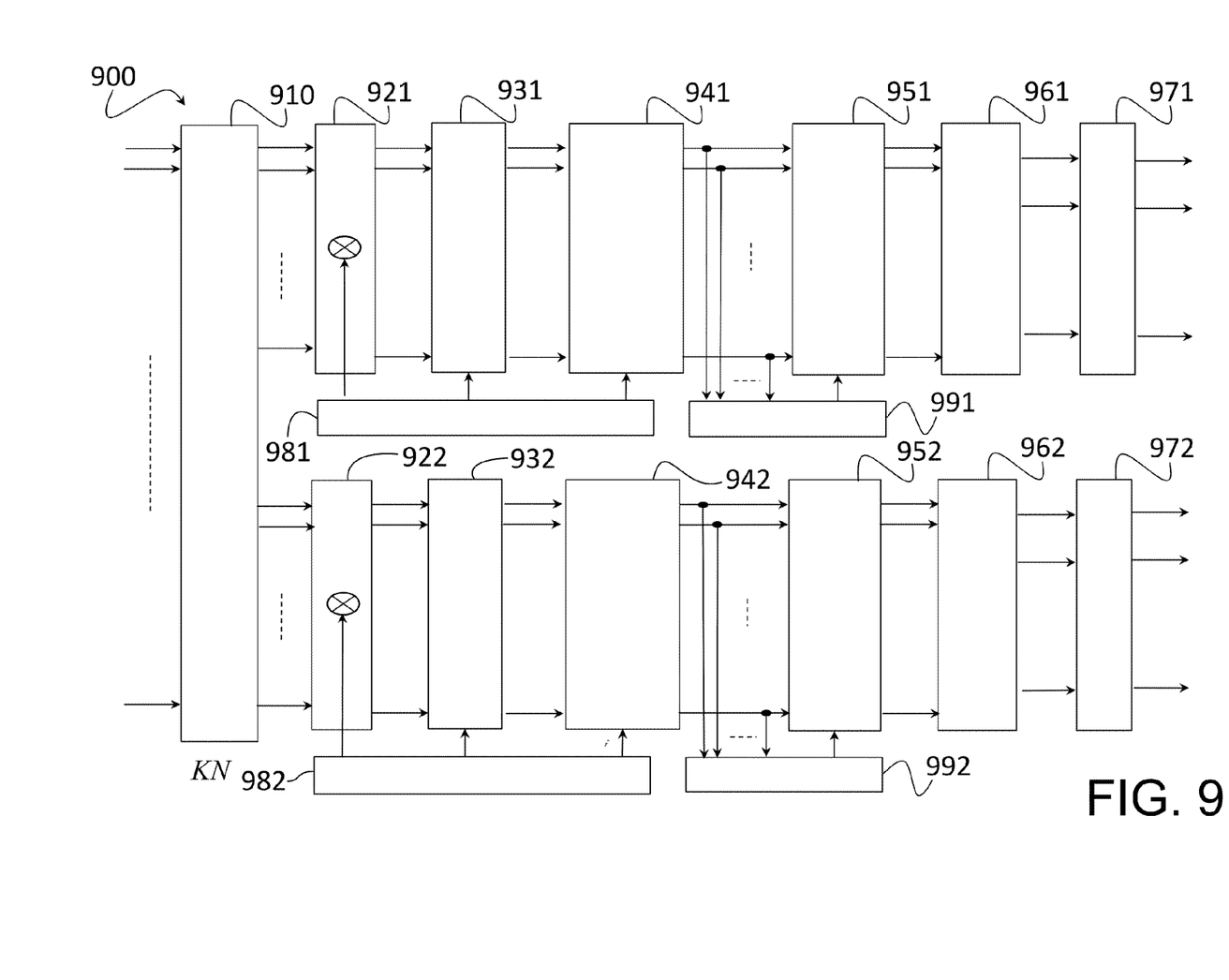
FIG. 9 illustrates an offset compensation on the upstream connection by the FBMC receiver of FIG. 6.

FIG. 9 shows the use of an FBMC receiver with carrier frequency offset compensation for a plurality of transmitters on the upstream connection.

The various users (FBMC transmitters) share access on the upstream connection using distinct subcarrier chunks as in a conventional OFDMA system.

The signals of the various users are translated at carrier frequencies that may be affected by independent drifts. After demodulation of these signals in baseband in the FBMC receiver, these signals are therefore affected by frequency offsets $\delta F_j$, $j=1, \ldots$, where J is the number of users sharing access to the upstream connection. It is assumed that the various FBMC transmitters use the same overlap factor.

For reasons of simplification, only two users (J=2) have been shown in FIG. 9.

The receiver 900 comprises an FFT module of size KN, the output of the FFT module being transmitted to as many reception connections as there are users. The elements 921, 931, ..., 991 relate to the reception channel of the first user and are respectively identical to the elements 620, 630, ..., 690 of FIG. 6. In a similar manner, the elements 922, 932, ..., 992 relate to the reception channel of the second user and are respectively identical to the elements 620, 630, ..., 690 of FIG. 6.

The frequency offsets $\hat{\delta F}_1$ and $\hat{\delta F}_2$ are respectively estimated by the estimators 681 and 682. These estimators supply respectively the phase factors $e^{-j\hat{\phi}_{n1}}$ and $e^{-j\hat{\phi}_{n2}}$ to the multipliers 921 and 922. Likewise the offset values $\hat{q}^1$ and $\hat{q}^2$ to the offset modules 931 and 932. At the output of the offset modules, the subcarriers relating to the other users may be abandoned. The vectors $\overline{Y}_n^1$ and $\overline{Y}_n^2$ are then respectively reduced to vectors $\overline{Y}_n^{1,red}$ and $\overline{Y}_n^{2,red}$ corresponding to the subcarrier intervals allocated to the first and second users. This makes it possible to reduce the matrices $W_1$ and $W_2$ correspondingly to the subcarriers of interest (some matrices of the complete matrices W obtained from $\hat{r}_1$ and $\hat{r}_2$). These reduced matrices have been denoted $W_1^{red}$ and $W_2^{red}$. Likewise the equalisation filters and the analysis filters may be simplified by reducing the corresponding matrices. It can be seen consequently that the frequency offset compensation proposed makes it possible to process the various users independently.

The invention claimed is:

1. A receiver of a filter bank multicarrier (FBMC) signal synthesised with a bank of N synthesis filters having an overlap factor K, said receiver comprising:
   an FFT module of size KN in order to effect an FFT on a block of KN samples of said signal, after baseband demodulation, and to supply a block of KN samples in the frequency domain, corresponding to KN subcarriers;
   a filtering module per bank of N analysis and spectral de-spreading filters in the frequency domain, said receiver also comprising:
   an estimator for estimating the carrier frequency offset between the carrier frequency of the signal and the baseband demodulation frequency of the receiver;
   a shift module downstream of the FFT module shifting the samples at the output of the FFT by a predetermined number of samples according to the carrier frequency offset estimated by said estimator;
   an interference reduction filter in order to reduce the interference between subcarriers by means of a multiplication by a matrix (W) having a band of non-zero coefficients of width 2Q+1, around the main diagonal, with Q<K, and zeroes everywhere else, said interference reduction filter operating on blocks of samples at the output of the shift module and supplying them to the filtering and spectral de-spreading module.

2. A signal receiver according to claim 1, wherein said predetermined number of samples is advantageously obtained as the integer part of a normalised offset defined as the ratio of $\widehat{\delta r}$ by $\Delta F_C/K$ where $\widehat{\delta r}$ is the carrier frequency offset estimated by the estimator and $\Delta F_C/K$ the frequency spacing between subcarriers.

3. A signal receiver according to claim 2, wherein the matrix of the interference filter is defined by:

$$W = F^H \overline{C}^H F$$

where F is the Fourier matrix of size KN×KN, $\overline{C} = \text{Diag}(\overline{C}_O, \ldots, \overline{C}_{KN-1})$ with $$\overline{c}_p = \exp\left(2\pi j \frac{p\hat{r}}{N}\right), p = 0, \ldots, NK-1$$

where $\hat{r}$ is the fractional part of the normalised offset divided by K.

4. A signal receiver according to claim 2, wherein the matrix of the interference filter is defined by:

$$W = \frac{S/N}{S/N+1}\left(F^H \cdot \overline{C}^H \cdot F\right)$$

where S/N is the signal to noise ratio at the receiver, F is the Fourier matrix of size KN×KN, $\overline{C} = \text{Diag}(\overline{C}_O, \ldots, \overline{C}_{KN-1})$ with $$\overline{c}_p = \exp\left(2\pi j \frac{p\hat{r}}{N}\right), p = 0, \ldots, NK-1$$

where $\hat{r}$ is the fractional part of the normalised offset divided by K.

5. A signal receiver according to claim 1, wherein the interference filter consists of a plurality (E) of elementary filters in a cascade, separated by multiplexers, each multiplexer being able to select the input or output of an elementary filter, each elementary filter effecting a matrix multiplication with a matrix $\overline{W}^i$ defined by $$\overline{W}^i = F^H \cdot \text{Diag}(\overline{W}_O^i, \ldots, \overline{W}_{KN-1}^i)^H \cdot F \text{ where}$$

$$\overline{w}_p^i = \exp\left(\pi j \frac{p}{2^{i-1}N}\right), p = 0, \ldots, NK-1.$$

6. A signal receiver according to claim 5, wherein each elementary filter is provided with an inversion control, said inversion control effecting a conjugation of the coefficients of the matrix $\overline{W}^i$ as well as a symmetry with respect to the main diagonal.

7. A signal receiver according to claim 6, wherein the offset estimator determines the fractional part P of the division of the carrier frequency offset, $\widehat{\delta r}$ by the frequency spacing between subcarriers, $\Delta F_C/K$, divided by K, and effects an approximation thereof by means of a dyadic decomposition $$\hat{r} = \sum_{i=1}^{E} \frac{r_i}{2^i}, r_i \in \{-1, 0, +1\},$$

the multiplexer of rank i short-circuiting the elementary filter of rank i if $r_i=0$ and activating its inversion control if $r_i=-1$.

8. A signal received according to claim 1, comprising a channel equaliser in the frequency domain operating on the blocks of samples at the output of the interference reduction filter, the channel equaliser being situated downstream of the interference filter and upstream of the filtering and spectral de-spreading module.

9. A signal receiver according to claim 1, wherein each block of samples output from the FFT or from the shift module or from the interference reduction filter is advantageously multiplied by means of a multiplier by a phase factor $e^{-j\Phi_n}$ where n is the index of the block, $\phi_n = 2\pi n \widehat{\delta r} \cdot T$, where $\widehat{\delta r}$ is the carrier frequency offset estimated by the carrier frequency offset estimator and T is the interval between FBMC symbols.

10. A signal receiver according to claim 9, comprising a post-processing module effecting an OQAM demodulation on the sample blocks output from the filtering and spectral de-spreading module.

11. A carrier frequency offset compensation method for compensating a carrier frequency offset in a receiver of a filter bank multicarrier (FBMC) signal, said FBMC signal being synthesised with a bank of N synthesis filters having an overlap factor K, said receiver effecting: an FFT of size KN on a block of KN samples of said signal, after baseband demodulation, in order to supply a block of KN samples in the frequency domain, corresponding to KN subcarriers, a filtering by a bank of N analysis filters followed by a spectral de-spreading in the frequency domain, said offset compensation method comprising:
   estimating the carrier frequency offset between the carrier frequency of the signal and the baseband demodulation frequency of the receiver;
   offsetting the samples at the output of the FFT in order to recover a block of samples offset by a predetermined number of samples, said number being obtained from the previously estimated carrier frequency offset; and
   filtering interference between subcarriers effected by multiplication of the block thus offset with a matrix having a band of non-zero coefficients, with a width 2Q+1, around the main diagonal, with Q>K, and zeroes everywhere else.

12. A carrier frequency offset compensation method according to claim 11, wherein said predetermined number of samples is advantageously obtained as the integer part of a normalised offset, defined as the ratio of $\hat{\delta F}$ to $\Delta F_C/K$ where $\hat{\delta F}$ is the carrier frequency offset estimated by the carrier frequency offset estimator and $\Delta F_C/K$ is the frequency spacing between subcarriers.

13. A carrier frequency offset compensation method according to claim 12, wherein the matrix of the interference filter is defined by:

$$W = F^H \overline{C}^H F$$

where F is the Fourier matrix of size KN×KN, $\overline{C}$=Diag$(\overline{C}_O, \ldots, \overline{C}_{KN-1})$ with $$\overline{c}_p = \exp\left(2\pi j \frac{p\hat{r}}{N}\right), p = 0, \ldots, NK - 1$$

where $\hat{r}$ is the fractional part of the division of the normalised offset divided by K.

14. A carrier frequency offset compensation method according to claim 11, wherein the matrix of the interference filter is defined by:

$$W = \frac{S/N}{S/N+1}\left(F^H \cdot \overline{C}^H \cdot F\right)$$

where S/N is the signal to noise ratio at the receiver, F is the Fourier matrix of size KN×KN, $\overline{C}$=$(\overline{C}_O, \ldots, \overline{C}_{KN-1})$ with $$\overline{c}_p = \exp\left(2\pi j \frac{p\hat{r}}{N}\right), p = 0, \ldots, NK - 1$$

where $\hat{r}$ is the fractional part of the normalised offset divided by K.

15. A carrier frequency offset compensation method according to claim 11, wherein the filtering operation comprises a plurality (E) of elementary filtering operations in a cascade, each filtering operation being able to be short-circuited and comprising a matrix multiplication with a matrix $\overline{W}^i$ defined by $\overline{W}^i = F^H \cdot \text{Diag}(\overline{W}_O^i, \ldots, \overline{W}_{KN-1}^i)^H \cdot F$ where $$\overline{w}_p^i = \exp\left(\pi j \frac{p}{2^{i-1}N}\right), p = 0, \ldots, NK - 1.$$

\* \* \* \* \*